April 21 1925.  
W. MALUSZ  
CLOTHESLINE PULLEY  
Filed March 11, 1924
1,534,800
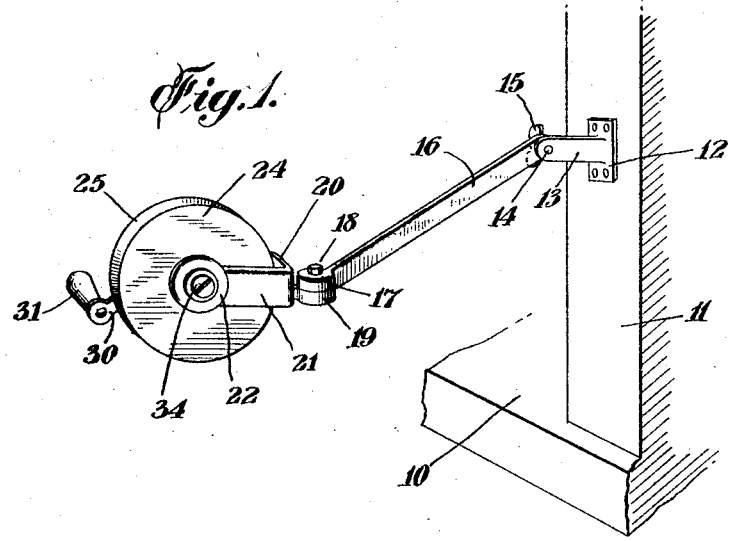
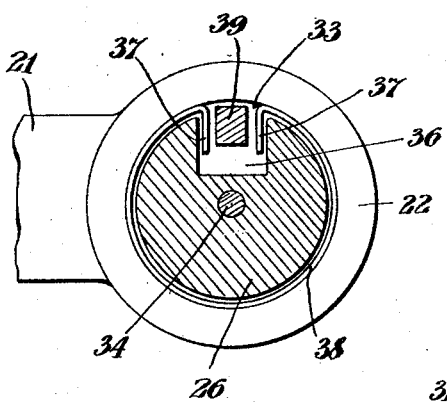
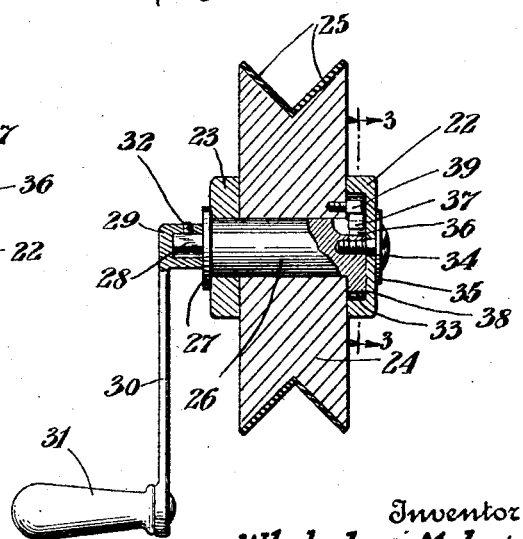
Inventor  
Wladyslaw Malusz  
By his Attorney Patented Apr. 21, 1925.

1,534,800

UNITED STATES PATENT OFFICE.

WŁADYSŁAW MALUSZ, OF HARRISON, NEW JERSEY.

CLOTHESLINE PULLEY.

Application filed March 11, 1924. Serial No. 698,425.

*To all whom it may concern:*

Be it known that I, WŁADYSŁAW MALUSZ, a citizen of Poland, residing at Harrison, in the county of Hudson and State of New Jersey, have invented certain new and useful Improvements in Clothesline Pulleys, of which the following is a specification.

This invention relates to improvements in line pulleys and particularly to types adapted to be attached to a window casing and over which a line, such as is used in suspending laundered articles, may be passed.

One object of the invention is to provide a stationary bracket with an arm adjustable angularly and having a pivoted clevis in which the pulley is rotatably mounted in such manner as to operate in various horizontal planes.

Another purpose is to produce means whereby the pulley may be manually rotated, thus moving the line as may be desired, other means being provided which prevent the pulley from rotating by pulling on the line.

A further aim is in the provision of a device which is easy to attach, safe to use by housewives and others, and which can be cheaply manufactured.

These several objects are attained by the novel construction, combination and arrangement of parts hereafter described and shown in the annexed drawing, forming a material part hereof, and in which:—

Figure 1 is a perspective view showing an embodiment of the invention, illustrating its application.

Figure 2 is an enlarged transverse sectional view of the pulley and its associated parts.

Figure 3 is a further enlarged sectional view taken on line 3—3 of Figure 2.

Referring to the drawings more in detail, the numeral 10 designates the sill of a conventional type of window and 11 the frame thereof, this frame being vertically disposed.

Secured by screws or like fastening means to the window frame or casing 11, is the base 12 of a bracket having a rigid outstanding projection 13, its outer end being drilled and tapped to receive a clamp screw 14 having a winged head 15 adapted to adjustably clamp a lever 16 to the bracket, the end of the lever being pivoted on the screw so that its outer end can be raised or lowered and secured in any desired adjustment.

A hub 17 is formed on the outer end of the lever and passing through the hub is a bolt 18 adjustably securing a lug 19 of similar shape and dimensions to it.

Said lug is fixed in the central element 20 of a U shaped clevis having parallel arms 21 expanded into hubs 22 and 23 respectively and between which is positioned a pulley 24 having an annular V shaped angular groove having a lining 25, preferably of material adapted to frictionally engage the line or cord which may be run over the pulley such as leather.

The pulley is mounted on a spindle 26 having a fixed collar 27 near one end seated against the clevis hub 23, the spindle terminating in a squared shank 28 fitted to the hub 29 of a lever 30 having an actuating handle 31, the shank being retained in the lever hub 29 by a pin 32.

The opposite hub 22 of the clevis contains an annular recess 33, open at its inner side, adjacent the pulley 24 and into which the end of the spindle 26 extends, the spindle being held by a screw 34 passing through the axis of the hub and clamping a washer 35 frictionally tight against the hub.

The end of the spindle 26 contains a slot 36, the same being receptive of the inturned ends 37 of a spring 38 loosely contained in the recess 33.

A square-headed stud 39 is screw-threaded into the side of the pulley 24, the head being so positioned as to extend into the slot 36, between the spring ends 37.

In operation, when the handle 31 is rotated, one of the spring ends will make contact with the head of the stud and transmit positive rotary motion to the pulley, thus winding a cord disposed in the angular groove in whichever direction may be desired.

Per contra, if the line be pulled, tending to rotate the pulley, the stud head is brought into engagement with one or the other of the spring ends, tending to spread or open the spring, setting up a powerful frictional effect in the interior of the hub recess 33, presenting an effective brake preventing the pulley from rotating.

From the foregoing it will be seen that the pulley can be raised or lowered and clamped in adjustment by the screw 14; also that the clevis is free to turn on the bolt 18, and that the pulley is readily rotated by hand in any desired direction but resists movement imparted by the pull of a line rove about it.

Due to the adjustability of its joints the pulley may be moved into any convenient position, thus affording a convenient device for the purposes mentioned.

It will be apparent, however, that minor changes may be made without conflicting with the spirit of the appended claims and which do not exercise inventive genius.

Having thus described my invention, what I claim as new and desire to secure by Letters Patent, is:—

A line pulley comprising an adjustably mounted clevis, a spindle rotatable therein, said spindle having a lateral slot in one end, manual means for rotating said spindle, a pulley mounted on the spindle between the arms of said clevis, one of said arms having an internal annular recess, a spring loosely disposed in the recess, the ends of said spring being bent to extend into the said slot, and a stud fixed in the side of said pulley, the head of said stud extending into the said slot between and spaced from the spring ends.

In witness whereof I have affixed my signature.

WŁADYSŁAW MALUSZ.